Dec. 16, 1952 P. E. CHAPMAN 2,622,128
GROWLER TYPE TESTING DEVICE
Filed July 11, 1949
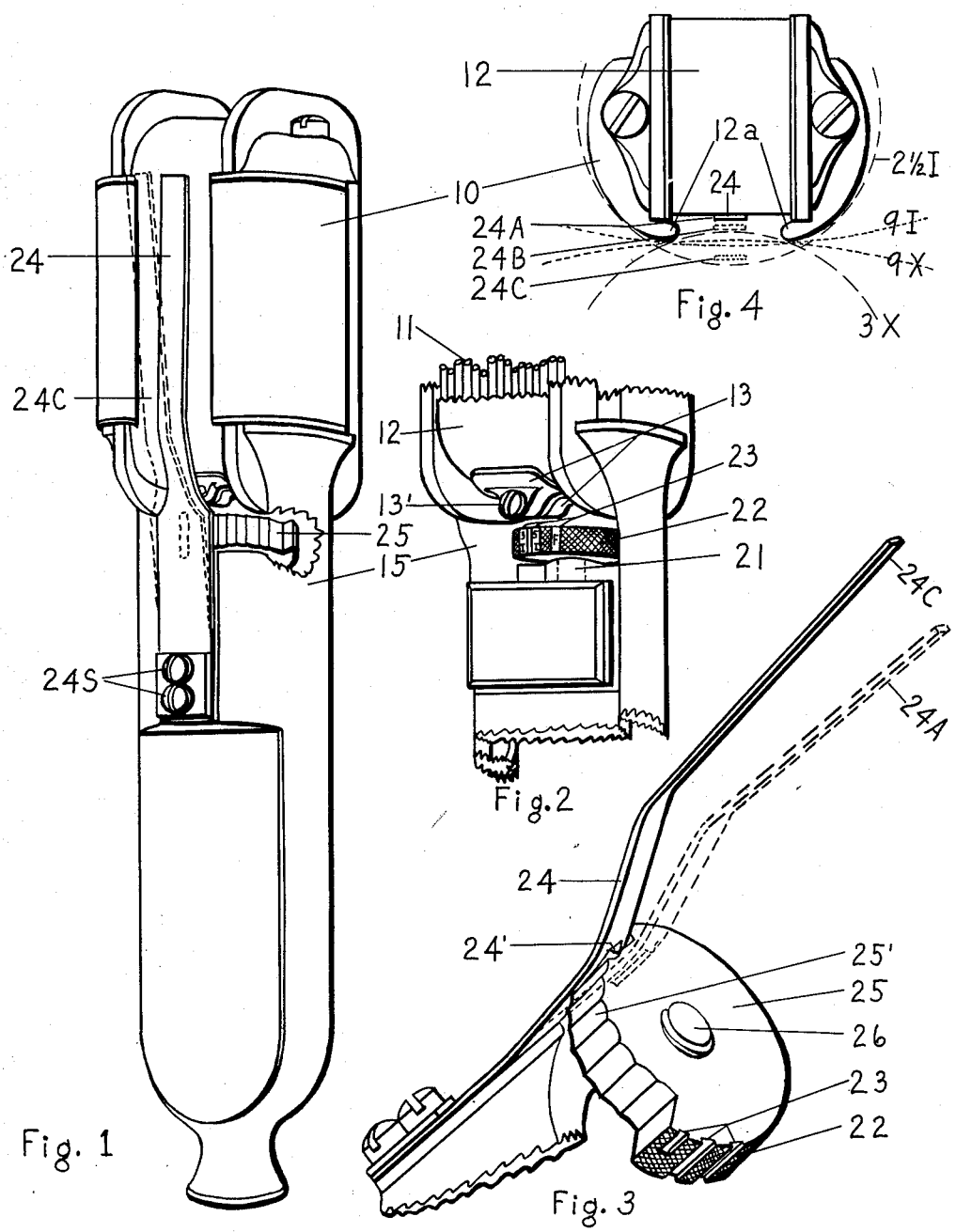
INVENTOR.
Penrose E. Chapman Patented Dec. 16, 1952

2,622,128

UNITED STATES PATENT OFFICE 2,622,128

GROWLER TYPE TESTING DEVICE

Penrose E. Chapman, St. Louis, Mo.; Wilbur C. Chapman, executor of the estate of Penrose E. Chapman, deceased, assignor to P. E. Chapman Electrical Works, Inc., St. Louis, Mo., a corporation of Missouri Application July 11, 1949, Serial No. 104,109

3 Claims. (Cl. 175—183)

The object of my invention is:
1. To enable testing of squirrel cage rotors for good or bad bars.
2. Simplify the testing of wound rotors or armatures.
3. Increase the range of sizes of internal stators that can be tested by a given growler.
4. By an adjustment, combine two or more of the above functions in one growler.

This invention is shown applied to a growler of the type shown in P. E. Chapman et al., Patent #1,924,913, which may be referred to for terminology, a description of growlers and the action of associated magnetic feelers.

The invention comprises a growler with a magnetic feeler which can be positioned selectively and readily by the user to any desired relation with the work to be tested. In the accompanying drawings illustrating different forms of the invention, Figure 1 is a bottom view looking towards the working face of a growler and the magnetic feeler thereon.

Figure 2 is a top view of a portion of the growler showing a cam for adjusting the position of the magnetic feeler.

Figure 3 is a perspective, drawn to an enlarged scale, showing the magnetic feeler and the associated adjusting cam.

Figure 4 is an end view of the growler showing diagrammatically different positions of the feeler and the contours of internal stators and external rotors to which the growler may be applied.

The device operates on the principle that the core of an electro-magnet may have a gap to be closed by a part of a stator or a rotor to which the growler is applied for testing and a vibrator in the gap is affected differently if the part is shorted than if the part is in desired condition.

As indicated in the above mentioned Patent No. 1,924,913, and as those who used devices of this type are well aware, the efficiency of the device depends upon the proximity of the vibrator or feeler to the part which is being tested.

To accomplish the above objects, it is necessary that the feeler 24, when testing, be held at a similar distance from the surface of the objects to be tested as stators and rotors indicated by the feeler position 24C, Fig. 4, with reference to stator surface line 2½I, feeler position 24B with reference to stator surface line 9I and rotor surface 9X, also feeler position 24A with reference to rotor surface line 3X. This requires that the feeler 24 be adjustably mounted with reference to the growler so that the feeler may be placed in a selected position relative to a line across the growler elements 12A which contact the work. Position of feeler, 24A would be about right for a small external rotor denoted by line 3X; 24B for a larger rotor denoted by line 9X and large internal stators as 9I; and 24C for small internal stators as 2½I.

The magnetic feeler is selectively positioned by a cam 25 (Fig. 3) having a series of feeler engaging steps 25' and a manipulating knurled surface 22 which is provided with an indicating scale 23 (Fig. 2) identifying different diameters of work and whether the work surface is internal or external.

Referring to Figs. 1 to 4: In use, the feeler 24 is adjusted to or from stator, or rotor, by rotating the cam 25 with the aid of the manipulating knurled surface 22; and is set for a given size of work by indexing scale 23. The action of the feeler so far as stators (internal) is concerned has been described in Patent #1,924,913. The action is exactly the same on squirrel cage rotors. However, when testing a rotor the test is for a thorough short circuit, so a good rotor bar will be indicated by a lively rattle, or sing of the feeler, whereas, a good coil will be indicated by silence on the part of the feeler, for a good coil is not short circuited. The word armature is herein used to include stators and rotors whether wound or squirrel cage.

The cam 25 may be carried by stud or shaft 26 that is supported by bridge 21 attached to handle 15 which in turn supports the growler core 10 and winding 11. Cam 25 which positions the feeler 24, is prevented from crawling by any suitable means, as the engagement of a selected step 25' in its working face by a portion 24' of the feeler.

While feelers will indicate when loosely held, they work better when fastened securely to the growler, as by screws 24S, depending on the elasticity of the shank of the feeler for the necessary adjusting motion.

Owing to limited space in which feeler 24 has to vibrate, see 24 in Fig. 4, it is necessary to provide said feeler with a back stop, as a tough impact resistance cover 12, for coil 11. Cover 12 should be tightly drawn over coil 11 by any suitable means as a band buckle 13, 13', 13.

Other arrangements for varying the position of the feeler may be made without departing from the spirit of the invention and the exclusive use of such modifications of the invention as come within the scope of the claims is contemplated.

I claim:

1. In a growler testing device of the class described, an electro-magnet structure for application to the work to be tested, a vibrator associated with said structure, and a rotatable cam bearing against the underside of said vibrator to vary its position with reference to the surface of said structure applied to the work.

2. In a growler testing device of the class described, an electro-magnet structure for application to the work to be tested, a vibrator associated with said structure, and a rotatable cam, the cam surface of which consists of a series of notches selectively engaging a portion of said vibrator, the notches and engaged vibrator portion yieldingly resisting rotation of the cam and holding the vibrator in adjusted position relative to the surface of said structure and the work to which it is applied.

3. In a growler of the class described for testing armatures, an electro-magnet structure for application to the work to be tested, a vibrator associated with said structure, and a rotatable cam, the cam surface of which consists of a series of stations engaging said vibrator to position it at different distances from the surface of said structure applied to the work to be tested, there being indicia associated with said stations to indicate different types of work for which the respective settings of the vibrator are adapted.

PENROSE E. CHAPMAN.

REFERENCES CITED

The following references are of record in the file of this patent:

UNITED STATES PATENTS

| Number | Name | Date |
| --- | --- | --- |
| 333,094 | Fuller | Dec. 28, 1885 |
| 726,277 | Fuller | Apr. 28, 1903 |
| 1,312,016 | Beeman | Aug. 5, 1919 |
| 1,460,227 | Courtier et al. | June 26, 1923 |
| 1,924,913 | Chapman et al. | Aug. 29, 1933 |
| 2,090,918 | Reichard | Aug. 24, 1937 |
| 2,141,141 | Kongsted | Dec. 20, 1938 |